United States Patent [19]

Paquola

[11] Patent Number: 5,277,155
[45] Date of Patent: Jan. 11, 1994

[54] SYSTEM FOR ACHIEVING FOUR-STROKE CYCLE IN AN INTERNAL COMBUSTION ENGINE WITH A SINGLE ROTATION OF THE CRANKSHAFT

[76] Inventor: Louis Paquola, 12, rue Verlaine, F-08130 Attigny, France

[21] Appl. No.: 916,834
[22] PCT Filed: Feb. 1, 1991
[86] PCT No.: PCT/FR91/00069
§ 371 Date: Aug. 5, 1992
§ 102(e) Date: Aug. 5, 1992
[87] PCT Pub. No.: WO91/12420
PCT Pub. Date: Aug. 22, 1991

[30] Foreign Application Priority Data
Feb. 12, 1990 [FR] France .................. 90 01608

[51] Int. Cl.[5] .......................... F02B 75/00
[52] U.S. Cl. .......................... 123/77
[58] Field of Search .......................... 123/77

[56] References Cited
FOREIGN PATENT DOCUMENTS

| 315250 | 9/1915 | Fed. Rep. of Germany . | |
|---|---|---|---|
| 757262 | 12/1933 | France . | |
| 847542 | 10/1939 | France . | |
| 977781 | 4/1951 | France . | |
| 1087236 | 2/1955 | France . | |
| 1111462 | 2/1956 | France . | |
| 2622251 | 10/1987 | France . | |
| 12561 | of 1913 | United Kingdom ........ | 123/77 |
| 581575 | 5/1944 | United Kingdom . | |

Primary Examiner—Noah P. Kamen
Attorney, Agent, or Firm—Harrison & Egbert

[57] ABSTRACT

A system for achieving a four-stroke cycle with a single rotation of a crankshaft in an internal combustion engine having a crank, a crank pin freely rotatable in a slide block of a runner 40. The runner 40 pivots on a pin rigidly attached to the bottom of an engine casing. The runner also pivots on the end of a link arm. The link arm pivots on a pin of a piston moving in a cylinder along a predefined stroke.

3 Claims, 1 Drawing Sheet

SYSTEM FOR ACHIEVING FOUR-STROKE CYCLE IN AN INTERNAL COMBUSTION ENGINE WITH A SINGLE ROTATION OF THE CRANKSHAFT

TECHNICAL FIELD

The invention relates to a system for obtaining a complete cycle with a single rotation of the crankshaft in a four-stroke internal combustion engine.

BACKGROUND ART

In internal combustion engines, particularly in four-stroke engines, the cycle is carried out in two rotations of the crankshaft. This uses the traditional link arm-crank system, which requires a full descent and return of the piston for a full turn to occur with a single rotation of the crankshaft. This situation leads to irregularities in the transferred torque and to stray inertial forces. These actions disrupt the balance of the engine.

A 0.5 reduction in ratio should be introduced in the transmission from the crankshaft rotation to the camshafts so as to assure proper distribution. This process, however, complicates engine kinematics, thus weakening the engine itself.

For a pre-determined number of cylinders, the power supplied is limited by the maximum inertial forces which can be supported by the pistons. Moreover, the effort to raise the power-to-weight ratio by increasing crankshaft rotation speed necessitates the addition of a substantial reduction mechanism, taking into account rotation speeds to be transferred to the wheels. This leads to rapid cylinder and piston wear.

Rapid engines require close and constant supervision of the number of crankshaft rotations. It must be taken into account that, as described above, during high speeds of operation, the link arm and pistons are quite close to the point of breaking down; high output is obtained at this cost.

A mechanism allowing a four-stroke engine to perform a cycle in a single rotation of the crankshaft is already known (French Patent Request No. 2,622,251). The aim of this mechanism is to increase the output of internal combustion engines and to simplify their construction. Its principal features are its orbital link arm, mounted on the oblique crankpin of a crankshaft, attached to the piston with an auxiliary link arm. Operation of this system requires replacing the classical rotation pin, joining the piston to the link arm with a swivel joint allowing orbital displacement of the auxiliary link arm. This complicates the structure, weakens the bond between the link arm and the piston and generates considerable cyclic end thrusting on the crankshaft. This can cause vibrations which are detrimental to the performance of the crankshaft bearings.

The object of this invention is to overcome these disadvantages. This invention, in its present form, resolves the problem of creating a new system for transforming linear piston displacement in an internal combustion engine to shaft rotation, thus allowing the association of two descents and returns of a piston with a single rotation of the shaft.

SUMMARY OF THE INVENTION

On a four-stroke internal combustion engine, the system allows for the achievement of a cycle with a single rotation of the crankshaft. On a two-stroke engine, the achievement of two cycles on a single rotation depends principally on a crank. In such an engine, the crankshaft is free to rotate in the slide block of a runner, pivoting on a pin that is rigidly attached to the bottom of the engine casing, or to a crossmember mounted on the engine block and pivoting on the end of the link arm, itself pivoting on the piston pin, moving in the cylinder along a predetermined stroke C.

For a fixed crank radius R, the length X of the link arm and the length Y of the runner are determined so that when the piston is in its lowest position, the crank forms a right angle with the pivoting runner. The distance D of the pivot pin of the runner with respect to the cylinder base is adjustable. The slide block is joined to the pivoting runner with a groove.

The advantages of the present invention are essentially that it permits a four-stroke internal combustion engine to achieve completion of the cycle corresponding to a single rotation of the crankshaft. This makes high power-to-mass ratios possible with rotation speeds still remaining much lower than maximum speeds permitted by the mechanical characteristics of the moving parts, particularly of the pistons. Moreover, output will be improved, owing to better evacuation of combusted gases, better filling and better combustion, due to a near doubling of the time spent for each of these operations, and all this with an identical crankshaft rotation speed. In addition, the possibility of varying the distance of the pivoting pin of the runner with respect to the cylinder base allows modification of the volumetric compression ratio, thus adapting the engine to specific uses including (diesel) auto-ignition and adjustment control to other parameters of engine operation.

These and other objects and advantages of the present invention will become apparent from a reading of the attached specification and appended claims.

DETAILED DESCRIPTION OF THE INVENTION

Figure 1:
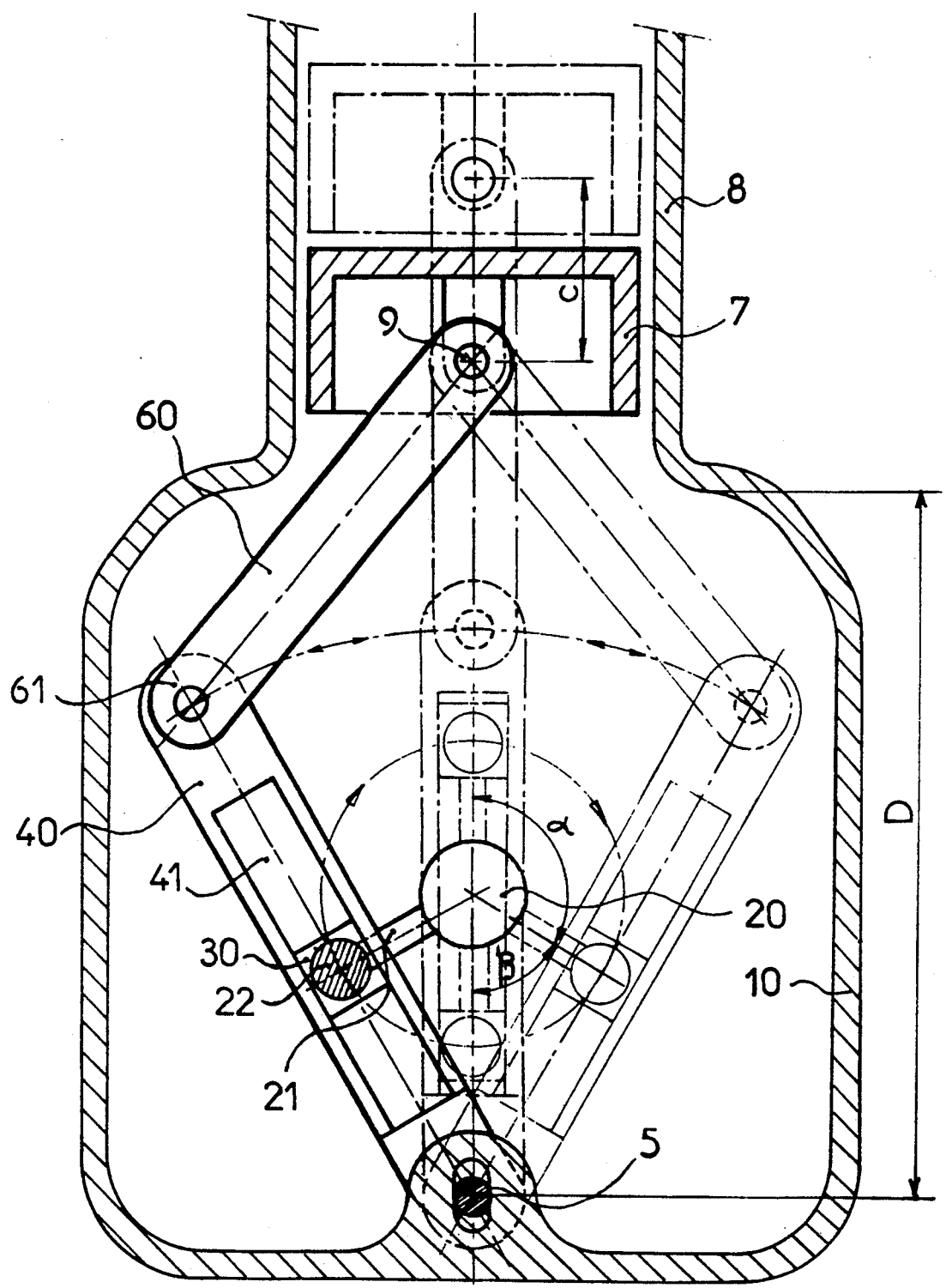
FIG. 1 is a cross-sectional view of the system of the present invention showing the four-stroke cycle in broken line fashion.

With reference to FIG. 1 a crankshaft 20 is positioned within an engine casing 10. The crankshaft 20 is interconnected to a piston 7. The piston 7 is received within a cylinder 8. A crank 21 is connected to the crankshaft 20 and has a crankpin 22. The crankpin 22 has an end which is freely rotatable in the slide block 30 of a runner 40. The runner 40 pivots on a pin 5. The pin 5 is rigidly attached to the engine casing 10 or it can be attached to a crossmember of the engine block. The runner 40 also pivots on the end 61 of a link arm 60. The link arm 60 pivots on a pin 9 of the piston 7. The slide block 30 is joined to the runner 40 in a groove 41.

When the piston 7 moves downwardly, the piston causes a progressive angular movement of the runner 40. The movement of the runner 40, in combination with the corresponding movement of the slide block 30, the crankpin 22 and the crank 21 produces a rotation of the crankshaft 20.

The length X of the link arm 60 and the length Y of the runner 40 are set such that when the piston 7 is in its lowest position, the crank 21 will form a right angle with the pivoting runner 40. During the downward stroke C of the piston 7, the crankshaft will complete a rotation of an obtuse angle $a$. The rotation of the crankshaft 20 will continue through an angle $\beta$ of 180° $-\alpha$. This occurs while the piston 7 continues a stroke C to return to its highest point. During this period, the crankshaft has rotated in a semi-circle when the piston has completed its descent and its return.

When the piston 7 goes through a second descent and return, the crankshaft will first complete a rotation of angle $\beta$ during the descending movement of the piston. The crankshaft will then complete complimentary angle $\alpha$ during the piston's upward movement. This action occurs through symmetry and through inertia.

When the two descents and returns of the piston 7 have been completed through stroke C, the crankshaft has rotated 360°, i.e. a full rotation. The four stroke of a Beau De Rochas cycle are therefore carried out with a single rotation of the crankshaft.

This same process can be used for a two-stroke cycle which is carried out, accordingly, in a half-rotation.

The principal applications are the present invention are for four- or two-stroke internal combustion engines. It is believed that the present invention could also be utilized for compressors and for pumps.

I claim:

1. A system for achieving a four-stroke cycle with a single rotation of a crankshaft in an internal combustion engine comprising a crank having a crank pin free to rotate in a slide block of a runner, said runner pivoting on a first pin affixed to a casing of the engine, said runner pivotably connected at another end to a link arm, said link arm pivotably connected at another end to a second pin attached to a piston of the engine, said piston slidably moveable within a cylinder of the engine along a desired stroke.

2. The system of claim 1, said crank forming a right angle with said runner when said piston is at the lowest position of said desired stroke within said cylinder.

3. The system of claim 1, said slide block is attached to said runner in a groove.

* * * * *